United States Patent
Romanov

(10) Patent No.: US 12,337,414 B2
(45) Date of Patent: Jun. 24, 2025

(54) DEVICE, SYSTEM AND METHOD FOR CALIBRATING A LASER DEVICE

(71) Applicant: Kurtz GmbH & Co. KG, Kreuzwertheim (DE)

(72) Inventor: Victor Romanov, Wertheim (DE)

(73) Assignee: Kurtz GmbH &Co. KG, Kreuzwertheim (DE)

( * ) Notice: Subject to any disclaimer, the term of this patent is extended or adjusted under 35 U.S.C. 154(b) by 0 days.

(21) Appl. No.: 18/840,150

(22) PCT Filed: Feb. 21, 2023

(86) PCT No.: PCT/EP2023/054300
§ 371 (c)(1),
(2) Date: Aug. 21, 2024

(87) PCT Pub. No.: WO2023/161223
PCT Pub. Date: Aug. 31, 2023

(65) Prior Publication Data
US 2025/0162077 A1 May 22, 2025

(30) Foreign Application Priority Data
Feb. 22, 2022 (DE) .................... 10 2022 104 184.0

(51) Int. Cl.
*B23K 26/342* (2014.01)
*B22F 10/31* (2021.01)
(Continued)

(52) U.S. Cl.
CPC ............ *B23K 26/342* (2015.10); *B22F 10/31* (2021.01); *B22F 12/90* (2021.01); *B33Y 30/00* (2014.12); *B33Y 50/00* (2014.12)

(58) Field of Classification Search
CPC ...... B23K 26/342; B33Y 30/00; B33Y 50/00; B22F 10/31; B22F 12/90
(Continued)

(56) References Cited

U.S. PATENT DOCUMENTS

| | | | |
|---|---|---|---|
| 2020/0215759 A1* | 7/2020 | Roblin | B33Y 50/00 |
| 2021/0308771 A1 | 10/2021 | Frechard et al. | |
| 2021/0379665 A1 | 12/2021 | Tanigawa et al. | |

FOREIGN PATENT DOCUMENTS

| | | |
|---|---|---|
| DE | 10 2009 016 585 A1 | 10/2010 |
| DE | 10 2011 006 553 A1 | 10/2012 |

(Continued)

OTHER PUBLICATIONS

International Preliminary Report on Patentability, mailed on Mar. 5, 2024, from International Application No. PCT/EP2023/054300, filed on Feb. 21, 2023. 16 pages.
(Continued)

*Primary Examiner* — Ibrahime A Abraham
*Assistant Examiner* — Joe E Mills, Jr.
(74) *Attorney, Agent, or Firm* — HoustonHogle LLP

(57) ABSTRACT

According to the invention, a device (1) for calibrating a laser device is provided, which is designed to freely position a working laser beam in a predetermined working range. This comprises a sensor plate (3) with one or more sensor fields (5) for arrangement in a working area, a perforated plate gauge (4) with one or more calibrating openings (6), wherein the at least one or more calibrating openings (6) are each arranged in the region of at least one or more of the sensor fields (5), a pilot laser device for providing a pilot laser beam along the path of the working laser beam to calibrate a laser device.

15 Claims, 1 Drawing Sheet

Figure 1:
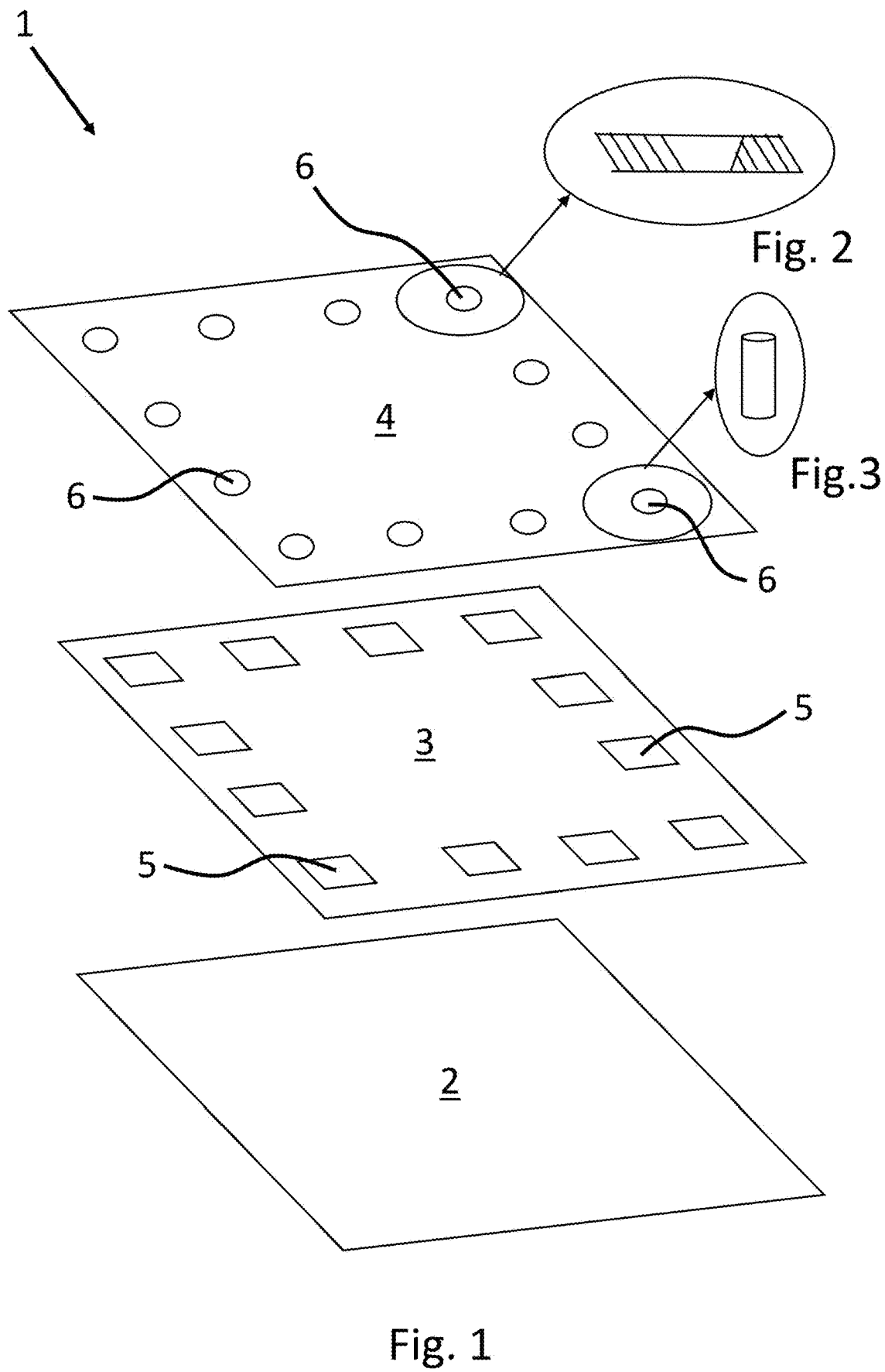

(51) Int. Cl.
    *B22F 12/90*     (2021.01)
    *B33Y 30/00*     (2015.01)
    *B33Y 50/00*     (2015.01)

(58) Field of Classification Search
    USPC .................................................. 219/76.14
    See application file for complete search history.

(56) References Cited

FOREIGN PATENT DOCUMENTS

| DE | 10 2011 006 553 B4 | 4/2013 |
|---|---|---|
| DE | 10 2020 100 217 A1 | 7/2021 |
| DE | 10 2020 122 670 A1 | 3/2022 |

OTHER PUBLICATIONS

International Search Report and Written Opinion of the International Searching Authority, mailed on May 30, 2023, from International Application No. PCT/EP2023/054300, filed on Feb. 21, 2023. 14 pages.

International Preliminary Examination Report (IPER) in German language, mailed Mar. 5, 2024 from the European Patent Office as International Preliminary Examining Authority (IPEA), from International Application No. PCT/EP2023/054300, filed on Feb. 21, 2023. 17 pages.

German Search Report mailed on Oct. 27, 2022, from German Application No. 10 2022 104 184.0, filed on Feb. 22, 2022. 14 pages.

\* cited by examiner

DEVICE, SYSTEM AND METHOD FOR CALIBRATING A LASER DEVICE

RELATED APPLICATIONS

This application is a § 371 National Phase Application of International Application No. PCT/EP2023/054300, filed on Feb. 21, 2023, now International Publication No. WO 2023/161223 A1, published on Aug. 31, 2023, which International Application claims priority to German Application 10 2022 104 184.0, filed on Feb. 22, 2022, all of which are incorporated herein by reference in their entirety.

The present invention relates to a device, a system and a method for calibrating a laser device which is designed to freely position a working laser beam in a predetermined working area.

3D printing makes it possible to produce a wide variety of three-dimensional components with complex geometries. Three-dimensional workpieces are built up layer by layer. The build-up is computer-controlled from one or more liquid or solid materials according to specified dimensions and shapes (CAD). Physical or chemical hardening or melting processes take place during the build-up. Typical materials for 3D printing are plastics, synthetic resins, ceramics and metals.

3D printing is a generative or additive manufacturing process. The most important 3D printing techniques are selective laser melting (SLM) and electron beam melting (EBM) for metals and selective laser sintering (SLS) for polymers, ceramics and metals.

Another generative process is selective melting and solidification. In this type of process, metal powder or metal wire is melted and solidified in layers so that a three-dimensional component can be generated. Due to the locally limited energy input using a laser beam, the size of the melt pool formed is small. This makes it possible to create intricate structures. Corresponding processes are commercially marketed as laser engineered net shaping (LENS), direct metal deposition (DMD), laser additive manufacturing (LAM), selective laser melting (SLM) or laser metal deposition (LMD).

In selective laser sintering (SLS/LMF), a layer of powder material is applied to a work surface (building platform). The loose powder is selectively melted by a laser beam. Depending on the material used, the powder particles are bonded in the layer and with the layer below. Two basic development directions can be differentiated for the production of metallic components. In addition to the direct solidification of metallic powder materials using laser radiation (direct metal laser sintering), the production of metallic components using a combination of SLS of plastic-coated metal powder with subsequent thermal treatment (IMLS) was established at an early stage.

Direct metal laser sintering (DMLS) uses either single or multi-component metal materials. In particular, DMLS multi-component powders are used, which consist of various alloying elements. The low-melting component contained in the powder is melted by a laser beam and flows around the high-melting component, which serves as a structuring agent.

In electron beam melting (EBM), the process sequence essentially corresponds to that of laser-based processes. Loose metal powder, in a powder bed or via a nozzle, or a wire is melted at certain points and then solidifies in the desired contour. The energy required for this is supplied by an electron beam. The process usually takes place in a vacuum chamber flooded with inert gas.

In electron beam melting, similar to selective laser melting (SLM), high energy is applied to melt the construction material. The energy is not supplied by a high-power laser, but by a strong electron beam that is deflected and positioned using powerful magnetic coils. The electron beam melting process must take place under a high vacuum. This significantly limits the installation space of devices that work with selective electron beam melting.

In recent years, processes have been developed to improve the processing of single-component metal materials. Corresponding processes are sold commercially under the name Selective Laser Melting (SLM), for example.

In contrast to selective laser sintering (SLS), selective laser melting (SLM) uses a laser beam to introduce significantly more energy into the powder bed, resulting in a real material melt in the affected areas. Compared to the SLS process, this produces a more homogeneous object with higher density.

Laser cladding is a type of cladding in which a surface is applied to a workpiece by melting and simultaneously applying almost any material. This can be done in powder form, e.g. as metal powder, or with a welding rod or strip. In laser cladding, the heat source is a high-power laser, primarily diode lasers or fibre lasers, formerly also CO2 and Nd:YAG lasers.

In laser cladding with powder, the laser usually heats the workpiece in a defocused manner and melts it locally. At the same time, an inert gas mixed with fine metal powder is fed in. The metal powder melts at the heated point and bonds with the metal of the workpiece. In addition to metal powder, ceramic powder materials, especially hard materials, can also be used. Laser cladding with wire or tape works in the same way as the process with powder, but with wire or tape as a filler material.

Accordingly, additive manufacturing processes use a powder bed, a powder feed or a wire feed, wherein these starting materials are then melted using a laser beam, electron beam, plasma/arc and then solidified. Furthermore, inert or active gases are used as process gases in additive manufacturing processes.

One aim of the aforementioned additive manufacturing processes is to ensure the most efficient energy input possible so that a safe manufacturing process and a high quality of the component are achieved.

In these processes, attempts are made to minimize critical influences and processes during energy input by means of suitable measures. In this context, the use of a substrate plate on which the component is fixed, process control under an inert gas atmosphere or the use of new scanning strategies for exposing the powder using laser energy are known.

DE 10 2011 006 553 A1 describes a method for determining a focus position or a beam profile of a light beam using a pinhole and a downstream detector. Instead of a single pinhole aperture, a pinhole plate with several holes, each defining measuring points, can also be used.

DE 10 2009 016 585 A1 describes a method and a device for calibrating an irradiation device, in particular a device for generative manufacturing of components, in which an image converter plate is provided which is irradiated locally with energy-containing radiation. The image converter plate converts the radiation energy into detectable light, which is detected by a detector.

DE 10 2020 122 670 A1 describes a further device for calibrating an irradiation device, in particular a 3D printing device, in which detection elements are provided outside the working area in order to calibrate the position of a light beam. The detection elements can have openings behind which optical sensors for detecting the light beams are arranged. DE 10 2020 100 217 A1 describes a method for automated beam positioning of a laser beam in relation to a nozzle of a laser processing head.

The object of the present invention is to provide a device and a method for calibrating a laser device which are adapted to freely position a working laser beam in a predetermined working area in order to arrange a working laser beam with a predetermined accuracy in a working area.

A further task of the present invention is to provide a device and a method for calibrating a laser device which enable a high degree of reproducibility.

In addition, one task of the present invention is to provide an improved device and an improved method for additive manufacturing in order to provide components more easily, more quickly and/or with higher quality.

A further task of the present invention is to provide an alternative method for additive manufacturing.

One or more of these tasks are solved by features of the independent patent claims. Advantageous embodiments are given in the dependent subclaims.

According to the invention, a device for calibrating a laser device is provided, which is designed to freely position a working laser beam in a predetermined working area. This comprises a sensor plate with one or more sensor fields for arrangement in a working area, a perforated plate gauge having a plurality of calibrating passage openings, the plurality of calibrating passage openings each being arranged in the region of a respective one of the plurality of sensor fields, a control device for determining the relative position of the sensor fields with respect to one another after exposure of the same through the calibrating passage openings of the perforated plate gauge, a pilot laser device for providing a pilot laser beam along the path of the working laser beam in order to calibrate a laser device by scanning the pilot laser beam by means of the sensor fields.

When calibrating the laser device by means of the sensor fields, whose relative position to each other is determined, the perforated plate gauge can be arranged on the sensor plate or removed from it. Since the relative position of the sensor fields is determined, the relative position of the pilot laser beam directed at one of the sensor fields to other positions of the pilot laser beam at which it is directed at the same or a different sensor field can be determined by means of the sensor fields.

The laser device is preferably a laser device of a device for additive manufacturing of components. Alternatively, however, other laser devices, for example for laser cutting, laser drilling or the like, can also be calibrated with the device according to the invention within the framework of the present invention. These devices have in common that a working laser beam of the laser device can be moved along a working area in order to carry out a predetermined working process there. The working area is preferably a building platform of a device for additive manufacturing.

In the context of the present invention, a laser device is preferably understood to be a processing head which is connected to a laser or a device for providing a laser beam in order to emit a laser beam or which has its own laser or a device for providing a laser beam in order to emit a laser beam. In the context of the present invention, unless otherwise described, a laser beam is understood to mean a laser beam section that is emitted from a processing head in the direction of the processing area.

The present invention is based on the realization that in laser devices with several processing heads, each of which emits a laser beam, the relative positioning of the processing heads to one another must be set very precisely, whereas the absolute positioning of all processing heads in the working area is not so important. In a device for additive manufacturing of components, it is irrelevant for the component whether it is manufactured at a predetermined position in the working area or slightly offset in this respect. However, it is extremely important that the individual sections of the component are positioned exactly in relation to each other. It is therefore possible to calibrate a laser device using a sensor plate and a perforated plate gauge, which are designed independently of the laser device. During the calibration process, both the sensor plate and the perforated plate gauge are first inserted into the laser device in order to pre-calibrate the sensor plate so that the relative position of the sensor fields to each other is known. The perforated plate gauge can then be removed. The sensor plate should maintain its exact position in the laser device during the calibration process, although it is of secondary importance how the sensor plate is positioned relative to the laser device. It is only important that it retains its position during the calibration process so that the individual working heads can be calibrated exactly relative to each other.

The combination of using a sensor plate with several sensor fields and a perforated plate gauge forms a very precise calibration device in a simple way. A sensor plate with several sensor fields is usually a printed circuit board on which several area scan cameras are arranged, each forming a sensor field. Such a printed circuit board can warp slightly due to the material. The distortions are primarily temperature-dependent. The relative positioning of the sensor fields is therefore not always very precise. By placing or positioning the perforated plate gauge with several calibration passages, each of which is arranged in the area of one of the sensor fields, initially only areas of the sensor fields are used to calibrate the laser device that are aligned in an exact local relationship to each other due to the exact alignment of the calibration passages of the perforated plate gauge. By means of the perforated plate gauge, therefore, initially only areas of the sensor fields that are in an exact local relationship to each other are accessible, so that the relative positions of the sensor fields can be determined on the basis of this local relationship known through the perforated plate gauge. Since the pre-calibration initially determines the position of the sensor fields in relation to each other, the calibration of the laser beams can be carried out with the resolution provided by the sensor fields, in contrast to the methods and devices from the prior art described above, and is not tied to the diameter of the calibration openings. Since the sensor fields have pixels that are generally much smaller than the calibration openings, a resolution defined by the size of the pixels of the sensor fields can be achieved. This device can therefore be used to precisely measure both the location of the respective pilot laser beam and the area with which it strikes the respective sensor field. The latter can be used to optimize the focusing of the pilot laser beam.

If the working heads of the laser device are thus calibrated using the areas of the sensor fields specified by the perforated plate gauge, they can be placed in an exact local relationship to each other. In other words, this means that the combination of sensor plate and perforated plate gauge forms a common uniform coordinate system to which all working heads are calibrated. This coordinate system defined by the sensor plate and the perforated plate gauge can therefore be referred to as the common main coordinate system.

In particular, it may be provided that the diameter of the pilot laser beam is smaller than the corresponding calibration openings. Since the local reference of the sensor fields is known, it is possible to determine the positions of the pilot laser beam with a higher resolution than is specified by the diameter of the calibration openings. The resolution is then limited solely by the size of the pixels of the sensor fields, which in conventional camera chips, such as CMOS or CCD sensors, is significantly smaller than the size of the calibration openings. Thus, a typical size of the pixels of the sensor fields is not larger than 2 μm×2 μm and preferably not larger than 1.5 μm×1.5 μm. The diameter of the calibration openings is preferably at least 2 mm, in particular at least 3 mm or at least 5 mm. The area of a calibration opening thus comprises a plurality of pixels of a sensor field.

The sensor plate is designed in such a way that it is subject to the same distortion due to the thermal influence of the working laser beam as a building platform and/or a component produced on the building platform.

The perforated plate can be made of an extremely stable material or a material with a high mechanical strength so that the holes do not change their position even under thermal stress and are arranged in an exact relation to each other in order to achieve a high level of accuracy. The calibration openings are mapped on the sensor fields of the sensor plate.

According to the invention, it is thus provided that a pilot laser beam is used to calibrate a working laser beam. The sensor plate is arranged on a working area of a laser device, in particular a building platform of a device for additive manufacturing. The perforated plate gauge is then placed on this sensor plate. The sensor fields of the sensor plate are then exposed via the calibration opening of the perforated plate gauge in order to determine the relative position of the sensor fields to each other. A pilot laser beam is then positioned on the sensor fields on the basis of control information by means of a laser device through the calibration opening of the perforated plate gauge. The pilot laser beam is thus directed onto the sensor fields through several calibration openings, with the control information forming target values. Now several actual values of location information of the pilot laser beam are detected by means of the sensor fields. These actual values are then compared with corresponding target values of location information for different locations or positions of the pilot laser beam and the respective deviations are determined.

In order to control a laser device, a working laser beam is positioned in a working range by means of control information, wherein, according to the invention, the deviations determined are used as correction values to determine the control information. A correction function can be generated on the basis of a comparison of actual values and target values of position information of a working laser beam in order to interpolate the determined values over a working range.

Furthermore, it can be provided that all sensor fields are covered by the perforated plate gauge, so that a calibration opening is arranged in the area of each sensor field.

This means that one aperture or a single perforated plate gauge is provided for all sensor fields of the sensor plate or a sensor device.

The sensor fields can be arranged in an edge area of the sensor plate.

During use, the greatest distortions due to the thermal energy introduced by the laser device occur in an edge area of a working area and/or a building platform of an additive manufacturing device. It may therefore be sufficient to simply determine the corresponding positions in the edge area of the working area. This makes the device cost-effective.

Corresponding sensor devices of the sensor fields can preferably detect a position with an accuracy of a few μ or even one μ.

Preferably, approximately 10 to 50 or 15 to 40 and in particular 20 to 30 sensor fields can be arranged on the sensor plate.

A laser device for providing a working laser beam can also be provided.

The laser device can be a fibre laser, for example. The laser can emit laser light with a power of at least 200 watts or at least 300 watts up to a maximum of 400 watts or up to a maximum of 600 watts or up to a maximum of 800 watts or up to a maximum of 1000 watts or up to a maximum of 1200 watts.

The pilot laser device can be part of the laser device or be designed as a separate pilot laser device.

For example, a laser from IPG Photonics, which is available under part number P21-010106, YLR-series SLED 3.0, can be used as a laser device. Such a laser beam can output a working laser beam and a pilot laser beam.

The pilot laser beam is preferably designed as a focused laser beam and can have a power of approx. 0.1 watts.

The pilot laser beam can be formed, for example, by coupling less light into a laser generation device of a laser device and/or by using a beam splitter, a polarization filter, a beam block, a deflection mirror or by providing a laser with a controllable pump stage whose pump stage can be switched off.

Therefore, both the working laser beam and the pilot laser beam can use the same fibres of a fibre laser.

Furthermore, the laser device may have several processing heads that are connected to a common laser in order to emit a laser beam in multiplex mode. Alternatively, the laser device can also have several processing heads, each of which has its own laser (singleplex). These two types of embodiments of the laser device with several processing heads for emitting laser beams are referred to as multi-laser devices in the context of the present invention.

In such a multi-laser device, the lasers of the processing heads are initially each referenced with regard to their own coordinate system in an X/Y plane, i.e. each processing head is assigned a separate coordinate system. This means that each laser of a processing head has its own coordinate system.

By calibrating the positions or the location of the lasers of the processing heads by means of the device according to the invention, all lasers of the processing heads can be referenced with respect to the common main coordinate system, so that they are then calibrated with respect to the common main coordinate system in the working area.

During calibration, each processing head moves its laser beam to at least one and preferably several points within its own referenced coordinate system, which are mapped to corresponding points of a uniform main coordinate system defined by the calibration device in order to calibrate the multi-laser device or the several lasers of the multi-laser device to this main coordinate system. In this way, all lasers of the processing heads can be aligned with respect to the uniform main coordinate system.

Furthermore, the processing heads can be aligned or adjusted in such a way that each optical axis of a respective laser beam of a processing head runs perpendicular to the working area of the building platform or the processing surface. Due to the perpendicular laser beams, the calibration can be carried out independently of the plane, so that the distance of a processing head and thus the corresponding laser beam can vary.

All optical axes of the multiple laser beams can be aligned perpendicular to a surface of the building platform. This means that the position of a laser beam on a corresponding sensor field of the sensor plate or the building platform changes when the distance of the laser device in the vertical direction (Z coordinate) from the sensor plate changes.

In addition, a measuring device with corresponding sensors for measuring the diameter of a laser beam can be provided. The diameter of the laser beam can, for example, be at least 30 μm, in particular at least 50 μm or at least 100 μm. The diameter of the laser beam is preferably no more than 2 mm, in particular no more than 1 mm or no more than 500 μm.

Not only one laser of a processing head of the laser device can be calibrated, but the several lasers of a laser device can be calibrated and aligned relative to each other.

Thus, with the present invention, not only one laser device with one laser can be calibrated in the processing area, but several lasers of processing heads can be calibrated in the respective processing area, so that the several lasers of the processing heads of the multi-laser device are also calibrated relative to each other in the processing area.

The sensor device can comprise a printed circuit board and CMOS sensors, and preferably an electronic network connection.

The edges of the perforated plate gauge that define the calibrating passage opening can be sharp-edged and/or tapered so that the perforated plate gauge is thin, at least in the area of the calibrating passage opening.

In this way, parallax errors can be avoided.

The diameter of the calibration opening can be approx. 4 to 5 mm smaller than the area of a corresponding sensor field of a CMOS sensor.

The area of a calibration opening can be smaller than the area of a corresponding sensor field of the sensor device.

In particular, the calibration openings can be arranged in a grid or array with spacings between 50 mm and 500 mm.

As the area of the calibration opening is smaller than the area of the corresponding sensor fields, the perforated plate gauge can be positioned easily.

The sensor plate and/or the perforated plate gauge can have a centering device for centered placement on a working area.

The working area is preferably a building platform of a device for additive manufacturing. Accordingly, it may be provided that the sensor plate is centered and aligned on such a building platform by means of a first centering device.

The perforated plate gauge can then be centered on the sensor plate using a second centering device.

A tube aperture pointing in the direction of the laser device can be arranged on each of the calibration openings. Such a tube aperture can be used to generate uniform diffuse light (dark field light) in the area of the sensor fields.

Furthermore, according to the invention, a system for calibrating a laser device is provided, which comprises a device for calibrating a laser device as shown above and a device for additive manufacturing with a plurality of processing heads for emitting laser beams.

In the context of the present invention, a device for additive manufacturing is understood to be a device for building up a three-dimensional component layer by layer using a powder bed, a powder feed or also a wire feed, which serve as the starting material and are melted by means of a laser beam or also an electron beam or also by means of plasma or an electric arc. Accordingly, the generative manufacturing processes mentioned in the introduction to the description (3D printing: Melting and solidification (laser engineered net shaping (LENS), as direct metal deposition (DMD) or as laser additive manufacturing (LAM)), localized sintering or melting, (laser sintering (SLS)) metal laser sintering (DMLS), metal laser sintering (IMLS), electron beam melting (EBM), powder bed based laser beam fusion laser powder bed fusion (LPBF) or laser cladding) for an additive manufacturing device.

Further provided according to the invention is a method for calibrating a laser device adapted to freely position a working laser beam in a predetermined working area. This method can use a device for calibrating a laser device as shown above and comprises the following steps Arrangement of a sensor plate on the working area, wherein the sensor plate has several sensor fields, Arrangement of a perforated plate gauge on the sensor plate, the perforated plate gauge having a plurality of calibrating apertures which are arranged in a predetermined arrangement relative to one another and in each case in the region of a sensor field, Exposure of sensor fields of the sensor plate via the calibration opening of the perforated plate gauge in order to determine the relative position of the sensor fields to each other, Positioning of a pilot laser beam on the basis of control information by means of a laser device onto the sensor fields, so that the pilot laser beam is directed onto several sensor fields, wherein the control information for positioning the pilot laser beam forms target values, detection of several actual values of location information of the pilot laser beam by means of the sensor fields, compare these actual values with corresponding target values of location information from different locations or positions of the pilot laser beam and determine the respective deviation.

The advantages of the method according to the invention correspond analogously to the advantages described above with reference to the device for calibrating a laser device. When calibrating the laser device, the perforated plate gauge can be arranged on the sensor plate. In this case, the sensor fields are only freely accessible in the area of the calibration openings and can be used to calibrate the laser device. Preferably, however, the perforated plate gauge is removed for calibrating the laser device so that the entire sensor fields are available for calibrating the laser device.

The sensor fields can be illuminated with the perforated plate gauge in place using the pilot laser beam or another light source. Suitable light sources are in particular light sources that emit diffuse light, such as dark field light sources.

In particular, it may be provided that the method is designed for several lasers of processing heads of a multi-laser device, wherein the following steps are carried out:

Positioning of a pilot laser beam on the basis of control information by means of a laser device through the calibration opening of the perforated plate gauge onto the sensor fields, so that the pilot laser beam is directed onto the sensor fields, wherein the control information forms target values, Detection of several actual values of location information of the pilot laser beam by means of the sensor fields, Compare these actual values with corresponding target values of location information from different locations or positions of the pilot laser beam and Determining the respective deviation for the individual laser beams of the processing heads, and Calibrating the multiple laser beams of the processing heads of the multi-laser device relative to each other in the processing area.

In addition, the invention provides a method for controlling a laser beam for a system as described above, wherein a working laser beam is positioned in a working area by means of control information. The method is characterized in that the deviations determined above are used as correction values to determine the control information.

A correction function can be generated based on a comparison of actual values and target values of location information of a working laser beam in order to interpolate the determined correction values over a working range.

The present invention is described in more detail below with reference to embodiments shown in the figures. These show in:

FIG. 1 A schematic perspective exploded view of a device according to the invention for calibrating a laser device, FIG. 2 is a schematic side view of a calibration opening of a perforated plate gauge of the device, and FIG. 3 a schematic perspective view of a tube orifice for a calibration opening of a perforated plate gauge of the device.

A device 1 for calibrating a laser device according to the invention is described in more detail below (FIGS. 1 to 3). The device 1 is designed to freely position a working laser beam in a predetermined working area. The working area is preferably a building platform 2 of a device for additive manufacturing (not shown).

The device 1 comprises a sensor plate 3 and a perforated plate gauge 4.

Furthermore, the device 1 comprises a pilot laser device (not shown) for providing a pilot laser beam along the beam path of a working laser beam in order to calibrate a laser device. Preferably, the pilot laser device is an integral part of a laser device of a device for additive manufacturing (not shown) or such a laser device is designed to provide a pilot laser beam. Alternatively, the pilot laser device can also be an independent laser device.

The sensor plate 3 has a roughly rectangular shape. In the area of the edges of the sensor plate 3, twelve sensor devices with corresponding sensor fields 5 are arranged all around in the present design example.

The sensor plate 3 is made of a material that has a similar warpage to a corresponding building platform of a device for additive manufacturing, such as a corresponding additively manufactured component.

According to this design example, the sensor fields 5 are arranged in an edge area of the sensor plate. Another suitable number of sensor fields 5 or sensor devices can also be used here. For example, at least four or six or eight or ten or twelve or 14 or 16 or 18 or 20 or 22 or 24 or 26 or 28 or 30 sensor fields and a maximum of 32 or 34 or 36 or 38 or 40 or 42 or 44 or 46 or 48 or 50 sensor fields 5 can be provided. Alternatively, the individual sensor fields 5 can also be arranged in a grid or array at approximately the same distance from each other.

The sensor plate 3 is made of a printed circuit board, wherein the sensor devices or sensor fields 5 are formed by CMOS sensors.

Furthermore, the sensor plate 3 has a network connection (not shown) for connecting to a corresponding data network.

The sensor plate 3 has a centering device (not shown), e.g. by means of dowel pins, in order to arrange it centered on a work area or a building platform 2. This fixes the sensor plate to the laser device during the calibration process.

The perforated plate gauge 4 also has an approximately rectangular shape. In addition, calibration openings 6 are formed in the perforated plate gauge 4, the number of which corresponds to the number of sensor fields 5 of the sensor plate 3. The calibration openings 6 are thus arranged in the perforated plate gauge 4 corresponding to the positions of the sensor fields 5 of the sensor plate 3.

The perforated plate gauge 4 is made of a material with a high inherent rigidity or a very stable material and thus a material with a high mechanical strength, so that the perforated plate gauge 4 has no distortion or almost no distortion when thermal energy is applied. This is very advantageous, as the calibration openings 6 are then always arranged in the same place or at the same position in relation to the building platform.

The corresponding calibration openings 6 of the perforated plate gauge 4 are mapped accordingly on the sensor fields 5 of the sensor plate 3 during use.

All sensor fields 5 are each assigned at least one calibration opening 6 of the perforated plate gauge 4, so that a calibration opening 6 is arranged in the area of each sensor field 5.

The edges or borders of the perforated plate gauge 4, which delimit the calibration openings 6, are sharp-edged or thin in such a way that parallax errors can be avoided.

In addition and/or alternatively, the calibration openings 6 or the edges of the perforated plate gauge 4 bounding the calibration openings 6 can be tapered in the direction of the sensor fields 5 in order to also avoid parallax errors (FIG. 2).

An area of the calibration opening 6 is smaller than an area of a corresponding sensor field 5 in order to be completely covered by the respective sensor field 5. In this way, the calibration openings 6 can be easily positioned or aligned according to the sensor fields 5 of the sensor plate 3.

In addition, a tubular diaphragm 7 pointing in the direction of the laser device can be arranged on each of the calibration openings 6 (FIG. 3). Uniform diffuse light (dark field light) can be generated in the area of the sensor fields 5 by means of the tubular diaphragm 7.

A system according to the invention for calibrating a laser device (not shown) comprises the device 1 shown above for calibrating a laser device and a device for additive manufacturing. The additive manufacturing device may be a corresponding device for one of the additive manufacturing processes shown above. Such a device comprises several processing heads for emitting one laser beam each.

Furthermore, according to the invention, a method is provided for calibrating a laser device which is designed to freely position a working laser beam in a predetermined working range. The method uses the device 1 described above for calibrating a laser device.

The procedure comprises the following steps:

First, a sensor plate 3 is arranged on a work area, in particular a building platform 2 of a device for additive manufacturing (S1). The sensor plate is aligned and centered on the building platform using a centering device.

A perforated plate gauge 4 is then arranged on the sensor plate 3, wherein the perforated plate gauge 4 has several calibration through-holes 6, which are arranged in a predetermined arrangement to one another (S2).

The sensor fields 5 are now exposed. Exposure takes place via the calibration openings 6 of the perforated plate gauge 4 in order to determine the relative position of the sensor fields 5 to each other (S3). The complete calibration openings 6 are mapped onto the respective sensor fields 5.

A pilot laser beam is then positioned on the sensor fields based on control information by means of a laser device through the calibration openings 6 of the perforated plate gauge 4 (S4). In this way, the pilot laser beam is directed through several calibration openings 6 onto the sensor fields. The corresponding control information forms target values.

The sensor fields 5 are then used to detect several actual values of location information of the pilot laser beam (S5).

Finally, these actual values are compared with corresponding target values of location information for different locations or positions of the pilot laser beam (S6).

Based on these values, the respective deviations of the target values from the actual values can be determined (S7).

In addition, the invention provides a method for controlling a laser beam using a system as described above, wherein a working laser beam with control information is positioned in a working area. To determine the control information, the deviations determined by means of the method for calibrating a laser device are used as correction values.

A correction function is generated based on a comparison of actual values and target values of location information of a working laser beam. The correction function can be used to interpolate the determined values over a working range.

Instead of a device for additive manufacturing, the device according to the invention can also be provided, for example, for calibrating a laser beam for a laser cutting device or the like.

Important elements of a laser cutting device or a laser beam cutting machine are the laser beam source, the laser beam guide and the processing head (focusing optics) including the cutting nozzle. The beam leaving the laser beam source can be guided in near-infrared (Nd:YAG lasers, fibre lasers, disk lasers) via fibre optic cables or, in the case of $CO_2$ lasers, via deflecting mirrors to the focusing optics at the processing point. The focusing optics bundle the laser beam into a focus and thus generate the intensity required for cutting.

Systems with $CO_2$ lasers usually consist of a fixed laser beam source and so-called flying optics. A mirror telescope ensures a constant raw beam diameter on the focusing lens over the entire processing area. This is necessary because the beam emerging from the laser has a fixed divergence. Different beam lengths for different processing positions would change the raw beam diameter on the lens without compensation by the reflector telescope. This would result in different aperture numbers and intensities.

The beam guidance between the optical resonator (laser beam source) and the focusing optics is realized by water-cooled mirrors, if necessary. The mirrors are coated with gold or molybdenum and are made of monocrystalline silicon or pure copper. Laser radiation in a wavelength range of approx. 1 µm (Nd:YAG lasers, fibre lasers, disk lasers), on the other hand, can also be guided over long distances using fibre optic cables.

For a direction-independent cut quality, phase-rotating mirrors are arranged between the resonator and telescope for linearly polarized laser beams.

The jet is focused through the so-called cutting nozzle, which is usually made of copper and also directs the blowing or process gas onto the processing area.

LIST OF REFERENCE SYMBOLS

1 Device
2 Building platform
3 Sensor plate
4 Perforated plate gauge
5 Sensor field
6 Calibration opening
7 Tubular diaphragm

The invention claimed is:

1. A device for calibrating a laser device which is designed to freely position a working laser beam in a predetermined working range, comprising
    a sensor plate with several sensor fields for arrangement in a working area,
    a perforated plate gauge with a plurality of calibration openings, wherein the plurality of calibration openings are each arranged in the region of one of the sensor fields, the surface of the calibration openings being smaller than the respective surface of a corresponding sensor field of the sensor plate
    a control device for determining the relative position of the sensor fields to each other after exposing them through the calibration openings of the perforated plate gauge,
    a pilot laser device for providing a pilot laser beam along the path of the working laser beam in order to calibrate a laser device by scanning the pilot laser beam by means of the sensor fields.

2. The device according to claim 1,
    wherein
    all sensor fields are covered by the perforated plate gauge, so that a calibration opening is arranged in the area of each sensor field.

3. The device according to claim 1,
    wherein
    the sensor fields are arranged in an edge region of the sensor plate.

4. The device according to claim 1,
    wherein
    a laser device is designed to provide a working laser beam.

5. The device according to claim 4,
    wherein
    the pilot laser device is part of the laser device or is designed as a separate pilot laser device.

6. The device according to claim 1,
    wherein
    the sensor plate comprises a printed circuit board and CMOS sensors and/or CCD sensors and an electronic network connection.

7. The device according to claim 1,
    wherein
    the edges of the perforated plate gauge bounding the calibration openings are sharp-edged and/or conical in such a way that the perforated plate is so thin, at least in the region of the calibration openings, that parallax errors can be avoided.

8. The device according to claim 1,
    wherein
    the calibration openings are arranged in a grid with spacings of between 50 mm and 500 mm.

9. The device according to claim 1,
    wherein
    the sensor plate and/or the perforated plate gauge have a centering device for centered arrangement in a working area.

10. The device according to claim 1,
    wherein
    a tubular diaphragm pointing in the direction of the laser device is arranged on each of the calibration openings in order to generate uniform diffuse light in the area of the sensor fields.

11. A system for calibrating a laser device comprising
a device for calibrating a laser device according to claim 1, and
a device for additive manufacturing, wherein the device for additive manufacturing comprises a plurality of processing heads for emitting a respective laser beam.

12. A method for calibrating a laser device adapted to freely position a working laser beam in a predetermined working area, in particular with a device according to claim 1, comprising the following steps:
- arranging a sensor plate on the working area, the sensor plate having a plurality of sensor fields,
- arranging a perforated plate gauge on the sensor plate, the perforated plate gauge having a plurality of calibration openings which are arranged in a predetermined arrangement relative to one another and in each case in the region of a sensor field,
- exposing sensor fields of the sensor plate via the calibration openings of the perforated plate gauge in order to determine the relative position of the sensor fields to one another,
- positioning of a pilot laser beam on the basis of control information by means of a laser device onto the sensor fields, so that the pilot laser beam is directed onto a plurality of sensor fields, wherein the control information for positioning the pilot laser beam forms target values,
- detecting several actual values of location information of the pilot laser beam by means of the sensor fields,
- comparing these actual values with corresponding target values of location information for different locations of the pilot laser beam, and determining the respective deviations.

13. The method according to claim 12,
wherein
the deviations determined are used as correction values to determine the control information for positioning a working laser beam.

14. The method according to claim 13,
wherein
a correction function is generated on the basis of a comparison of actual values and target values of location information of a working laser beam in order to interpolate the determined values over a working range.

15. The method according to claim 12,
wherein the method is designed for a plurality of laser beams from processing heads of a multi-laser device, the following further steps being carried out,
determining the respective deviation for the individual laser beams of the processing heads, and
calibrating the multiple laser beams of the processing heads of the multi-laser device relative to each other in the processing area.

* * * * *